United States Patent
Nikazm et al.

(10) Patent No.: US 8,812,748 B2
(45) Date of Patent: Aug. 19, 2014

(54) METHODS FOR GENERATING DISPLAY SIGNALS IN AN INFORMATION HANDLING SYSTEM

(75) Inventors: Ayedin Nikazm, Austin, TX (US); James R. Utz, Round Rock, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 905 days.

(21) Appl. No.: 12/423,875

(22) Filed: Apr. 15, 2009

(65) Prior Publication Data

US 2010/0268860 A1   Oct. 21, 2010

(51) Int. Cl.
*G06F 3/00* (2006.01)

(52) U.S. Cl.
CPC ........................................ *G06F 3/00* (2013.01)
USPC ............................................... 710/11; 710/16

(58) Field of Classification Search
USPC ........ 710/11, 16–18, 104, 316; 345/501, 502, 345/520; 439/638
See application file for complete search history.

(56) References Cited

U.S. PATENT DOCUMENTS

| | | | | |
|---|---|---|---|---|
| 4,500,933 A | * | 2/1985 | Chan | 360/69 |
| 4,972,470 A | * | 11/1990 | Farago | 713/192 |
| 5,159,683 A | * | 10/1992 | Lvovsky et al. | 710/9 |
| 5,561,764 A | * | 10/1996 | Ninomiya | 714/37 |
| 5,691,741 A | * | 11/1997 | Kerigan et al. | 345/698 |
| 5,842,045 A | * | 11/1998 | Nakamura | 710/63 |
| 6,131,125 A | * | 10/2000 | Rostoker et al. | 709/250 |
| 6,753,881 B1 | * | 6/2004 | Callway et al. | 345/699 |
| 6,873,307 B2 | * | 3/2005 | Nitta et al. | 345/3.1 |
| 7,283,178 B2 | * | 10/2007 | Dahlseid et al. | 348/553 |
| 7,485,007 B1 | * | 2/2009 | Nee | 439/640 |
| 7,502,947 B2 | * | 3/2009 | Chen et al. | 713/300 |
| 2003/0174156 A1 | * | 9/2003 | Katsuhara et al. | 345/700 |
| 2003/0229748 A1 | * | 12/2003 | Brewer et al. | 710/305 |
| 2005/0160214 A1 | * | 7/2005 | Sauber et al. | 710/315 |
| 2006/0046534 A1 | * | 3/2006 | Birmingham | 439/76.1 |
| 2006/0181480 A1 | * | 8/2006 | Yee | 345/3.1 |
| 2006/0238524 A1 | * | 10/2006 | Hsieh et al. | 345/204 |
| 2007/0120953 A1 | * | 5/2007 | Koga et al. | 348/14.01 |
| 2008/0168519 A1 | | 7/2008 | Rao et al. | |
| 2008/0172501 A1 | * | 7/2008 | Goodart et al. | 710/33 |
| 2009/0201312 A1 | * | 8/2009 | Wu et al. | 345/619 |
| 2010/0082859 A1 | * | 4/2010 | Hendry et al. | 710/60 |

OTHER PUBLICATIONS

DisplayPort, Wikipedia, undated.*
Mini DisplayPort to VGA Adaptor, Apple Store, [visited Nov. 11, 2008 and Mar. 13, 2009], USA.

* cited by examiner

*Primary Examiner* — Khanh Dang
(74) *Attorney, Agent, or Firm* — Baker Botts L.L.P.

(57) ABSTRACT

An information handling system (IHS) is provide for generating display signals associated with an alternative display protocol. The system may include a display protocol receptacle operable to receive a display protocol plug and a display bus switch in communication with the display protocol receptacle. The system may also include a display converter in communication with the IHS. The display converter may include a first end having a display connector associated with an alternative display protocol and a second end having a display protocol plug. Moreover, upon receipt of the display protocol plug by the display protocol receptacle, the display bus switch may output display signals associated with the alternative display protocol.

19 Claims, 7 Drawing Sheets

METHODS FOR GENERATING DISPLAY SIGNALS IN AN INFORMATION HANDLING SYSTEM

TECHNICAL FIELD

The present disclosure relates generally to the field of information handling systems, and more specifically, to generating display signals.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Furthermore, digital displays are becoming increasing popular for use with information handling systems in both the consumer and business environments. Digital interfaces possess certain advantages over traditional analog interfaces in that digital interfaces have higher bandwidth and experience less interference in their signals. As a result, the electronics industry has begun a steady migration away from analog interfaces such as Video Graphics Array (VGA) toward newer digital interfaces such as Digital Visual Interface (DVI) and High Definition Multimedia Interface (HDMI). This transition has fostered the creation of a display protocol, such as the DisplayPort interface, developed by the Video Electronics Standards Association. DisplayPort addresses certain encryption problems exhibited by alternative display protocols, such as DVI and HDMI, and provides a much higher bandwidth.

Despite these advances, numerous legacy devices still exist that use older or alternative display protocols, i.e., VGA, DVI, HDMI, and many more electronics are likely to include these standards for the foreseeable future. Thus, manufacturers have included display converters to convert DisplayPort signals to those of these older or alternative display protocols. These display converters provide backwards compatibility with the legacy devices that may not use DisplayPort. However, many of the current display converters are bulky, not aesthetically pleasing, and must contain active electronic circuitry to perform the display conversions. Having such electronic circuitry in particular contributes greatly to the large size of these display converters which my reduce portability and may result in degradation of display quality. Thus, a system that includes a compact and inexpensive display protocol converter with no active electronics may be desired.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for an information handling system (IHS). The system may include a display protocol receptacle operable to receive a display protocol plug and a display bus switch in communication with the display protocol receptacle. The system may also include a display converter in communication with the IHS. The display converter may include a first end having a display connector associated with an alternative display protocol and a second end having a display protocol plug. Moreover, upon receipt of the display protocol plug by the display protocol receptacle, the display bus switch may output display signals associated with the alternative display protocol.

Another aspect of the present disclosure provides for a method for generating display signals in an information handling system (IHS). The method may include receiving a display converter via a display protocol receptacle in the IHS. Additionally, the method may include determining an alternative display protocol associated with the display converter and outputting display signals associated with the alternative display protocol via the IHS.

A further aspect of the present disclosure provides for an information handling system (IHS) for generating display signals associated with an alternative display protocol. The system may include a display protocol receptacle and display converter operable to be received by the display protocol receptacle, wherein upon receipt, the IHS outputs display signals associated with the alternative display protocol, and wherein the display converter is a pass-through device.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable media are described, it is to be understood that this disclosure is not limited to the particular systems, methods, and media described, as such may vary. One of ordinary skill in the art should understand that the terminology used herein is for the purpose of describing possible aspects, embodiments and/or implementations only, and is not intended to limit the scope of the present disclosure which will be limited only by the appended claims.

This disclosure is not limited in its application to the details of construction and the arrangement of components set forth in the following description or illustrated in the drawings. The disclosure is capable of other embodiments, implementations or aspects and of being practiced or of being carried out in various ways. Also, the use of "including," "comprising," "having," "containing," "involving," "consisting" and variations thereof, is meant to encompass the items listed thereafter and equivalents thereof as well as additional items.

It must also be noted that as used herein and in the appended claims, the singular forms "a," "and," and "the" may include plural referents unless the context clearly dictates otherwise. Thus, for example, reference to "a switch" refers to one or several switches and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Furthermore, while the present disclosure may make references to DisplayPort as merely one example of a display protocol, it should be noted that the present disclosure is not limited to specifically DisplayPort. For example, the present disclosure may also apply to future modifications to, successors and/or subsets of DisplayPort.

Figure 1:
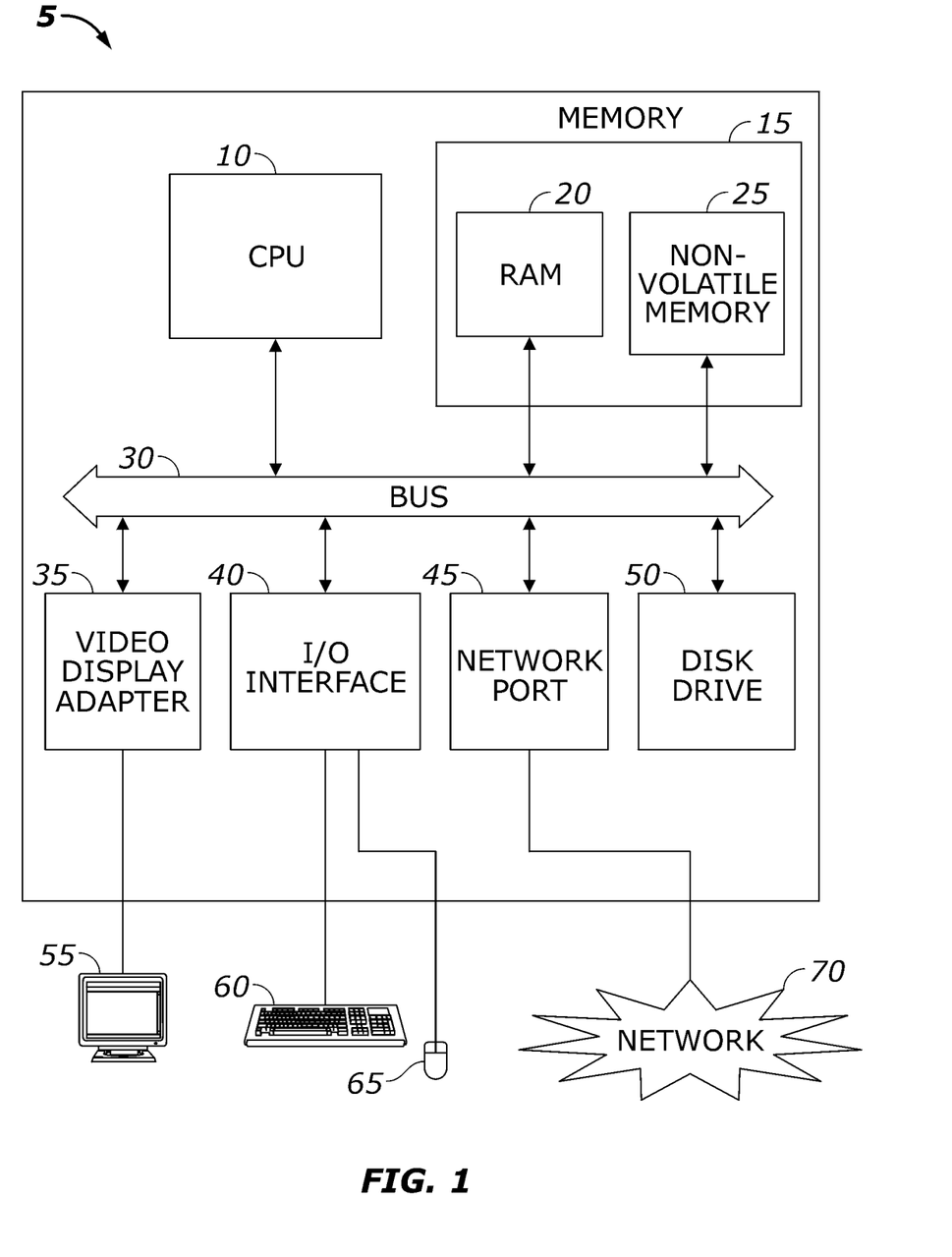
FIG. 1 represents an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
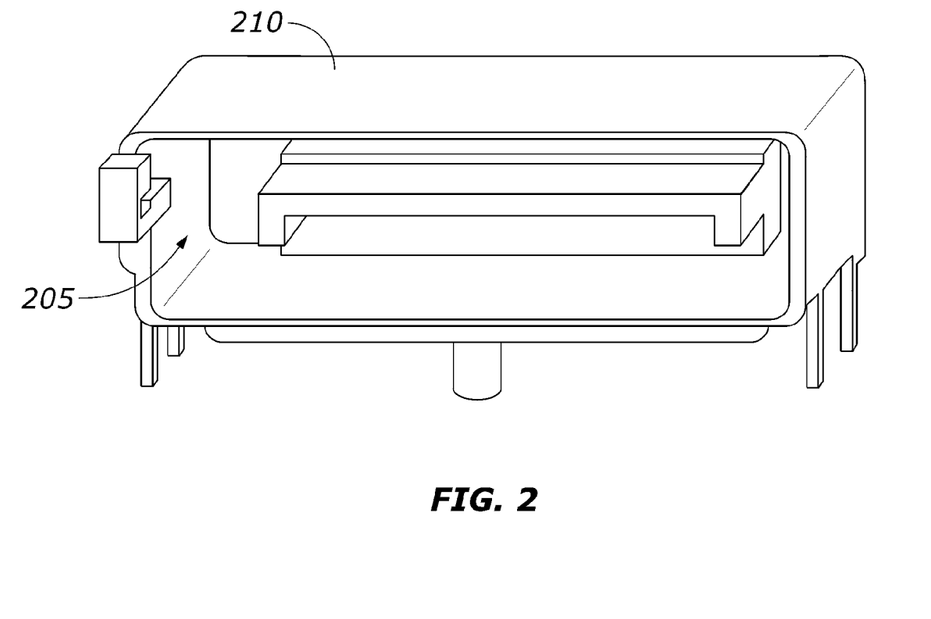
FIG. 2 represents a front view of a display protocol receptacle in accordance with one aspect of the present disclosure.
Figure 3A:
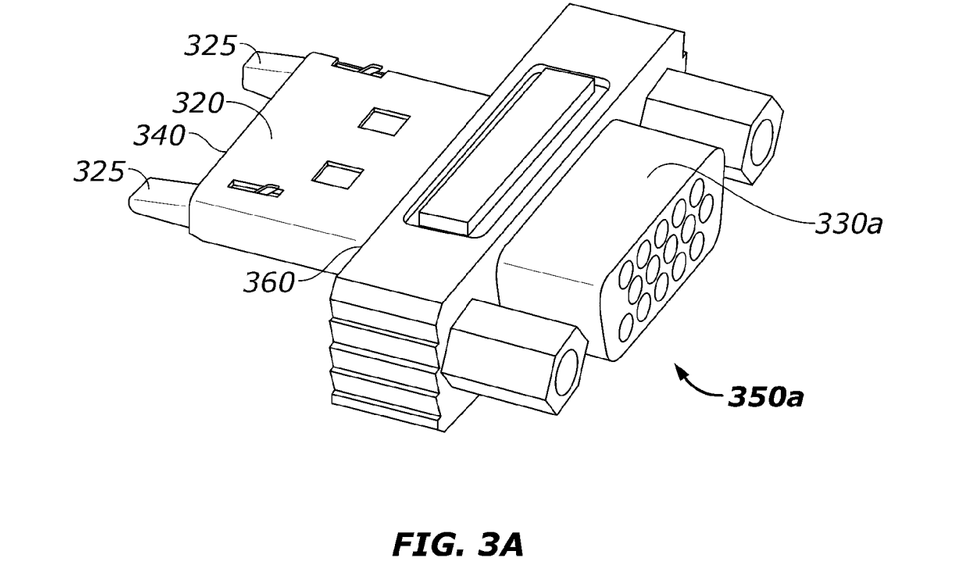
FIG. 3A represents an isometric view of a display converter for a first alternative display protocol.
Figure 3B:
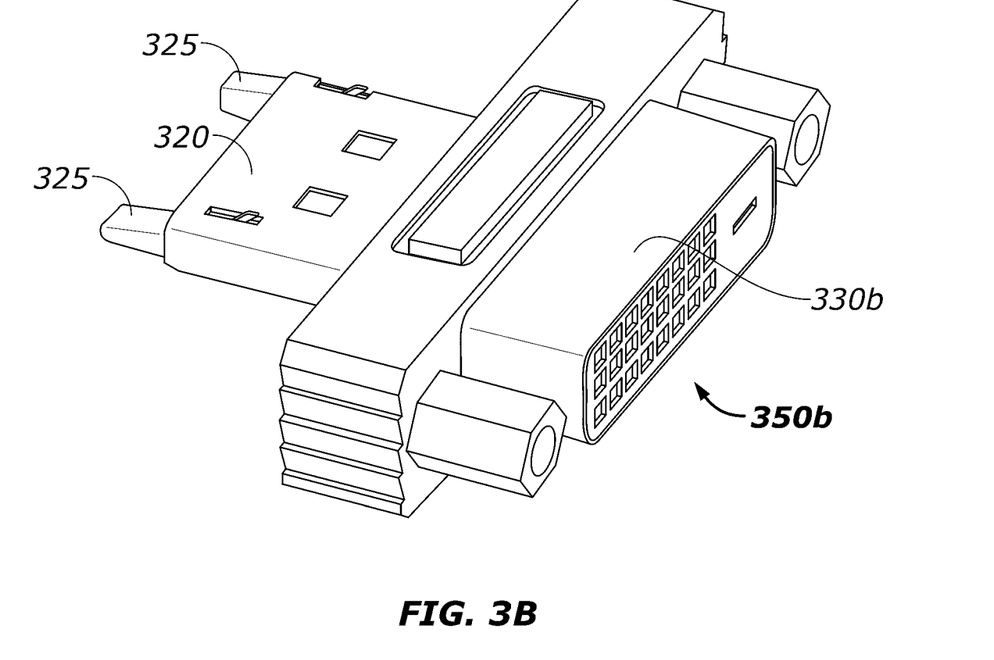
FIG. 3B represents an isometric view of a display converter for a second alternative display protocol.
Figure 3C:
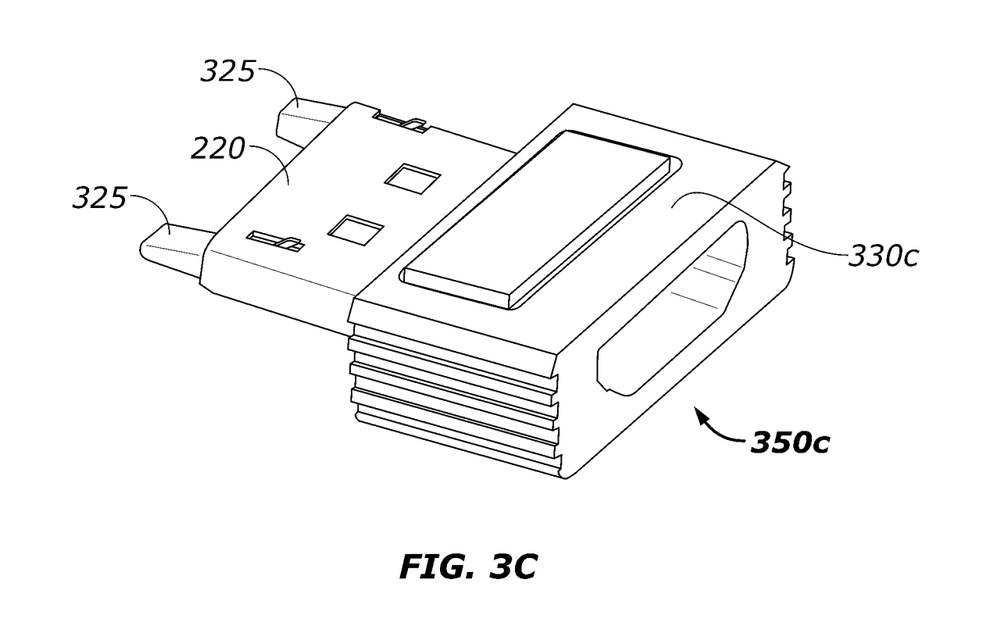
FIG. 3C represents an isometric view of a display converter for a third alternative display protocol.

FIG. 2 represents a front view of a display protocol receptacle 210, and FIG. 3A-FIG. 3C represents various display converters 350a-c associated with the display protocol receptacle 210 in accordance with certain aspects of the present disclosure. The display protocol receptacle 210 may reside within an IHS 5 chassis, and typically, may be operable to receive a display protocol cable (not pictured) to connect to a video display (not pictured). Furthermore, the display protocol receptacle 210 may be operable to receive display converters 350a-c that convert display protocol signals to signals associated with alternative display protocols.

In one implementation, the display protocol may be DisplayPort such that the display protocol receptacle 210 may receive a DisplayPort connection such as through a DisplayPort cable. DisplayPort may be a digital display protocol developed by the Video Electronics Standards Association (VESA). DisplayPort may provide a license-free, royalty-free display standard that may typically be used between an IHS and a video display or a computer and a home-theater system, for example. To this end, DisplayPort may be capable of transmitting high definition video for home theater systems (e.g., up to 1920×1080 pixels) and even higher resolutions for video displays.

Moreover, as used herein, an alternative display protocol may refer to any display protocol that is not DisplayPort. For example, High Definition Multimedia Interface (HDMI) may represent an alternative display protocol that may be employed in many television sets and a growing number of IHSs and video displays as well. In addition, HDMI may be capable of carrying audio data. Digital Visual Interface (DVI) may provide another alternative display protocol operable to transmit digital display data and may have primary use with IHS and video displays. As another alternative, Video Graphics Array (VGA) has had widespread use as a primary analog display protocol for IHSs and video displays. Though VGA may be a predecessor to newer digital display protocols, it may still be commonly used in current IHSs and may therefore still be a viable alternative display protocol. Again, it should be noted that alternative display protocols are not limited to the specific examples given above.

Because of the existence of various alternative display protocols, an IHS employing DisplayPort as its graphical output may require display converters to interface with the alternative display protocols. For example, if an IHS includes a DisplayPort receptacle, but a video display includes an HDMI receptacle, a display converter for the IHS may be used to convert DisplayPort signals to HDMI signals. Thus, a display converter may be operable to couple a first device, which may be associated with DisplayPort, to a second device, which may be associated with an alternative display protocol. However, such a conversion may require additional active circuitry, and conventionally, such active circuitry may be included within the adapter. As a result, the display converter may be relatively expensive and bulky.

Therefore, as depicted in FIG. 3A-FIG. 3C, display converter 350a-c, which contain no active electronic circuitry for display conversion, may be used to interface display protocol signals (e.g., DisplayPort signals) with alternative display protocols. Thus, because the display converters 350a-c contain no active electronic circuitry, it may be referred to as a pass-through device. Specifically, FIG. 3A illustrates a display converter 350a for VGA, FIG. 3B illustrates a display converter 350b for DVI, and FIG. 3B illustrates a display converter 350c for HDMI. VGA may be an older analog graphical standard first developed by IBM. Because such alternative display protocols are all still in use in various electronic devices, display converters 350a-c may provide additional display flexibility in an IHS 5 having only a display protocol receptacle 210. Additionally, it should be noted that the present disclosure is not limited to display converters for VGA, DVI, and HDMI and that display converters for any other display protocols are also contemplated.

Each display converter 350a-c may have a first end having a display protocol plug 320 and a second end having a display connector 330a-c. In one implementation, the display protocol plug may be a DisplayPort plug operable to engage the display protocol receptacle 210. Additionally, the display protocol plug 320 may have an attached end 340 and a free end 360. The attached end 340 may be engaged with the display connector 330a-c while the free end 360 may be received by the display protocol receptacle 210, as shown in FIGS. 3A-C. As such, the display protocol plug 320 may include one or more protruding arms 325 extending horizontally from the free end 360. The protruding arms 325 may be operable to serve several purposes. First, the protruding arms 325 may prevent the insertion of the display converters 350a-c into receptacles others than a display protocol receptacle 210. As a result, in implementations where the display protocol is DisplayPort, typical DisplayPort receptacles may be unable to receive display converters 350a-c because of the protruding arms 325. As such, any other display converters that include the display protocol plug 325 may also be incompatible with typical DisplayPort receptacles.

Figure 4:
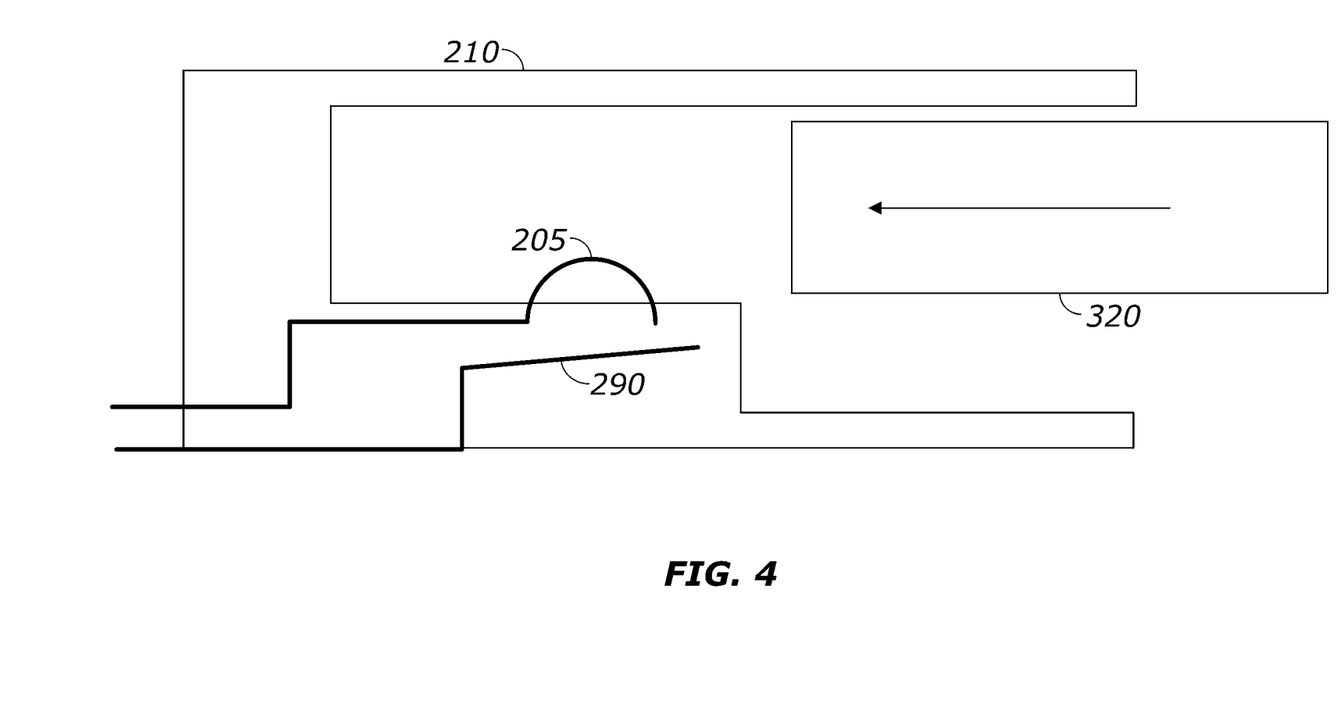
FIG. 4 represents a magnified side view of a display protocol receptacle in accordance with one aspect of the present disclosure.

Furthermore, the protruding arms 325 may be configured to trigger the detector contact 205 in the display protocol receptacle 210. Subsequently, a signal to the IHS may be made indicating that a display converter 350 has been inserted, as will be further described later. For example, the insertion of a display converter 350a-c via the display protocol plug 320 into the display protocol receptacle 210 may cause the detector contact 205 to close a switch circuit within the display protocol receptacle. The switch circuit may cause a signal to be sent to certain components (e.g., a display bus switch) within the IHS 5 to indicate that a display converter 350a-c has been connected. As a result, the IHS 5 may begin providing display signals associated with a particular alternative display protocol, depending on the display converter 350a-c, rather than providing display protocol signals e.g., DisplayPort signals. FIG. 4 may provide a more detailed illustration of the detector contact 205 within the display protocol receptacle 210.

Moreover, each display converter 350a-c may also have a second end which may include a display connector 330a-c for connection with an alternative display protocol. For example, the display connector 330a depicted FIG. 3A may be operable to receive a VGA cable while display connector 330b in FIG. 3B may be operable to receive a DVI cable. Thus, a video display compatible only with an alternative display protocol input may still interface with an IHS having only the display protocol output, such as a DisplayPort output for example. For instance, if a video display has a DVI input while an IHS has a DisplayPort output, display converter 350b, which has a DVI display connector 330b, may be used. To this end, the display converter 350b may be inserted into the display protocol receptacle 210 via the modified Display protocol plug 320. A DVI cable may then be used to connect the IHS to the video display. Furthermore, while the display connectors 330a-c may be depicted to show "female" connectors operable to receive "male" attachment members, other implementations may contemplate the display connectors 330a-c to include "male" connectors instead.

Turning now to FIG. 4, a magnified side view of the display protocol receptacle 210 is presented in accordance with one aspect of the present disclosure. In one implementation, the display protocol receptacle 210 may be located within an IHS chassis but may be exposed to couple to a peripheral device. Furthermore, the display protocol receptacle 210 may be coupled to certain internal components of the IHS. For example, the display protocol receptacle may be coupled to a graphics controller within the IHS. Furthermore, the display protocol receptacle may comprise a detector contact 205, which may include a projection that may be contacted (e.g., depressed) with the insertion of a display converter 350a-c having a Display protocol plug 320. In one implementation, the protruding arms 325 extending from the Display protocol plug 320 may be operable to depress the detector contact 205 once inserted into the display protocol receptacle 210. As such, depressing the detector contact 205 may result in the closing of a switch circuit 290 to indicate that the display converter 350a-c has been inserted. Once this switch circuit 290 has been closed, the IHS may begin providing display signals associated with the alternative display protocol associated with the display converter 350a-c.

Figure 5:
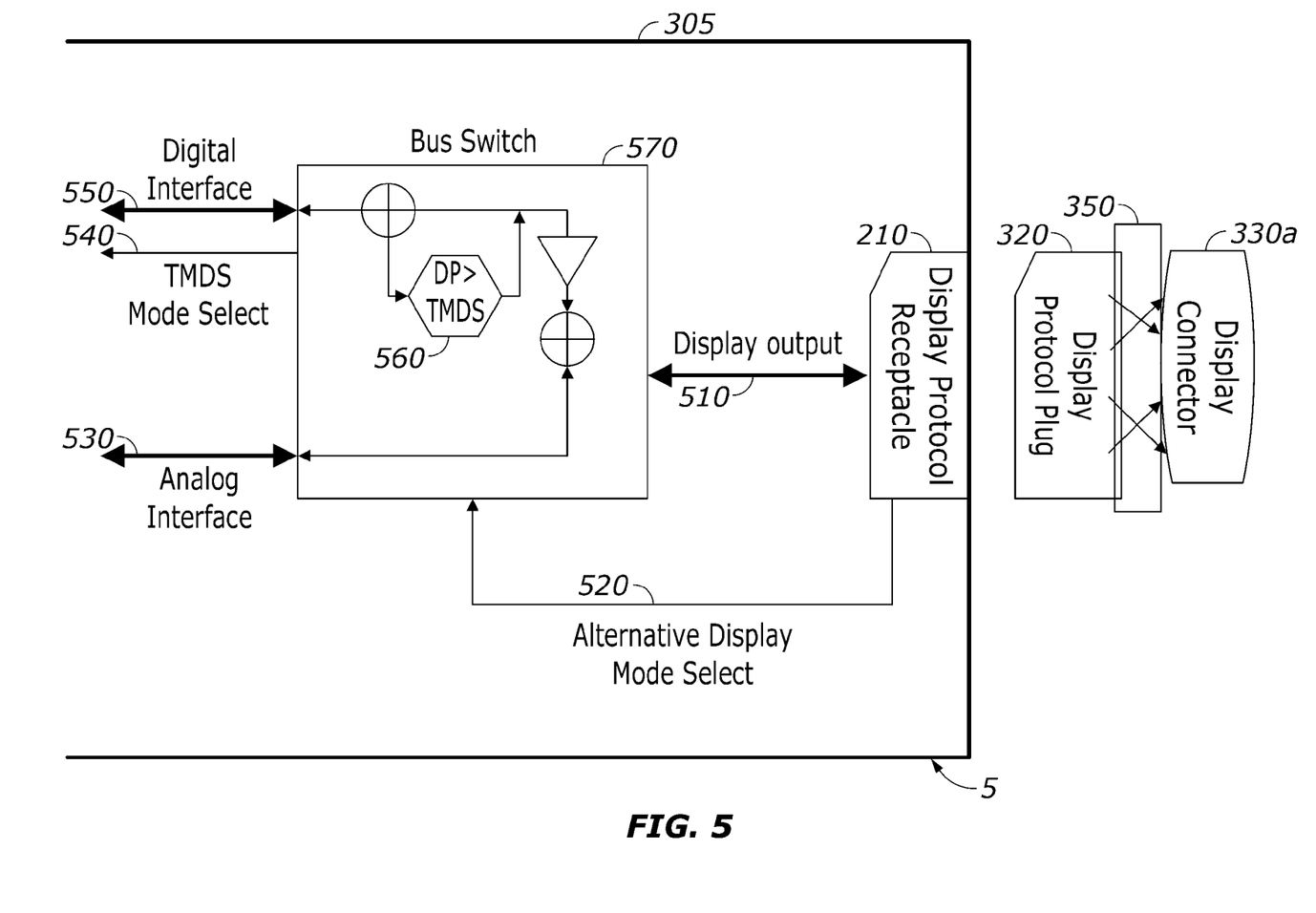
FIG. 5 represents an IHS for generating signals associated with an alternative display protocol in accordance with one aspect of the present disclosure.

FIG. 5 represents a schematic illustrating an IHS 5 for generating signals associated with an alternative display protocol in accordance with one aspect of the present disclosure. Under typical operation, the IHS 5 may be configured to provide display protocol signals such as DisplayPort signals through the display protocol receptacle 210. However, the IHS 5 may also include a display converter 350, which may be a peripheral component coupled to the chassis 505, for passing alternative display protocols through the display protocol receptacle 210. As such, the display protocol receptacle 210 may be located within the chassis 505. Additionally, as previously mentioned, the display converter 350 may comprise a display protocol plug 320 on a first end, for insertion into the display protocol receptacle 210, and a display connector 330 associated with an alternative display protocol on a second end. As depicted in FIG. 5, the alternative display protocol associated with the display connector 330a may be VGA, but it should be noted that any other type of connector for any other display protocol, such as DVI, HDMI, or the like, is also contemplated within the present disclosure.

Furthermore, the display protocol receptacle 210 may be coupled to a display bus switch 570 which may be circuitry located within the chassis 505 such as on a graphics controller, motherboard, and/or the like. The display bus switch 570 may be operable to select between multiple display protocols and output the appropriate display signals via the display output 510. For example, typically, the IHS may be coupled to a video display (not pictured) via a DisplayPort connection (e.g., a DisplayPort cable). Thus, the display bus switch 570 may output DisplayPort signals through the display protocol receptacle 210 via the display output 510. The Display Port signals may then be transmitted through a DisplayPort cable to the video display.

On the other hand, if a display converter 350 is inserted into the display protocol receptacle 210, a switch circuit, as shown in FIG. 4, within the display protocol receptacle may be closed due to the protruding arms of the display converter 350. Upon closing of the switch circuit, an alternative display mode select signal 520 may be indicated to the display bus switch 570. Thus, the IHS may be notified of the presence of the display converter 350 and therefore of a request to use an alternative display protocol. Consequently, the display bus switch 570 may output display information associated with the alternative display protocol rather.

To this end, the display bus switch 570 may further have the ability to determine the exact type display converter 350 that has been inserted, and therefore, the particular alternative display protocol associated with the display converter 350. For example, assume that the display protocol of the display protocol receptacle 210 is DisplayPort. According to the DisplayPort specification, pin 13 and pin 14 in a DisplayPort connector may be used to select between DisplayPort, DVI, and HDMI signals to be passed. Under this framework, the display protocol plug 320 of the display converter 350 would include pins 13, 14, and all other pins of a typical DisplayPort connector. As such, if either pin 13 or pin 14 are active, an indication may be made to the display bus switch 570 that the display connector 330 of the display converter 350 is associated with either DVI or HDMI as the alternative display protocol. On the other hand, if neither pin 13 nor pin 14 are active, the display bus switch may determine that the display connector 330 is associated with an analog alternative display protocol e.g., VGA.

As specifically applied to FIG. 5, the display bus switch 570 may determine that a display converter 350 with a VGA connector 330a has been inserted, i.e., pin 13 and pin 14 in the display protocol plug 320 are not active. In this scenario, the display bus switch 570 may direct a graphics controller (not pictured) to send VGA display signals to the display bus switch 570 through an analog interface 530 since VGA is an analog protocol. The VGA signals may then be output through the display output 510.

If, however, the display converter 350 includes a display connector 330 associated with a digital protocol, such as a DVI or HDMI for example, the display bus switch 570 may direct the graphics controller to send display information using a digital interface 550 instead. Under this scenario, pin 13 or pin 14 in the display protocol plug 320 may be active. By way of example, the Multi Mode interface, which may enable DisplayPort, DVI, and HDMI display information to pass through the same line of communication, may be employed as the digital interface 550. Furthermore, while DisplayPort, DVI, and HDMI may all be digital display protocols, DisplayPort signals may be alternating current (AC) coupled, and HDMI and DVI may be direct current (DC) coupled. Therefore, for display converters 350 using a DVI or HDMI display connector, the AC coupled DisplayPort signal may be converted into a DC coupled signal, such as the Transition Minimized Differential Signaling (TMDS) standard since DVI and HDMI are DC coupled. TMDS may be used to transmit high-speed serial data used by both DVI and HDMI. Thus, a TMDS mode select 540 signal may be indicated so that the DisplayPort signal may be converted to a TMDS signal via a DisplayPort to TMDS signal converter 560.

Thus, depending on whether a display converter 350 has been coupled to the IHS 5 through the display protocol receptacle 210 and the type of display converter 350 utilized, the display bus switch 570 may determine which display protocol to use to output display signals through the display output 510. Furthermore, because all display conversion may be performed within the IHS, the display converter 350 may simply be a pass-through device, i.e., the display converter 350 may contain no active electronic components to convert the display output 510 to the display converter's 350 associated alternative display protocol. As a result, the size and cost of the display converter 350 may be reduced relative to those in current use, and display converter 350 may become more aesthetically pleasing.

Moreover, because the display converter 350 may not need to perform any active conversion of the display output 510, degradation of the display output 510 may also be reduced. For example, conventional display converters for converting any digital display signal (e.g., DisplayPort, DVI, and HDMI) to an analog display signal (e.g., VGA) typically involve circuitry for performing a digital to analog conversion. To this end, a graphics controller within the IHS may output a DisplayPort signal to the display converter, and the display converter may contain circuitry to perform the conversion (including digital to analog conversion).

Because the display converter 350 of the present disclosure may be a pass-through device, the VGA signal may instead be sourced directly from the graphics controller through the analog interface 530. Thus, no actual DisplayPort to VGA or digital to analog conversion may need to take place and an accurate VGA output may be attained. Still further, though FIG. 5 has been described with some specificity to VGA, DVI, and HDMI as examples of alternative display protocols to DisplayPort, any other type of display protocol is also contemplated within the present disclosure.

Figure 6:
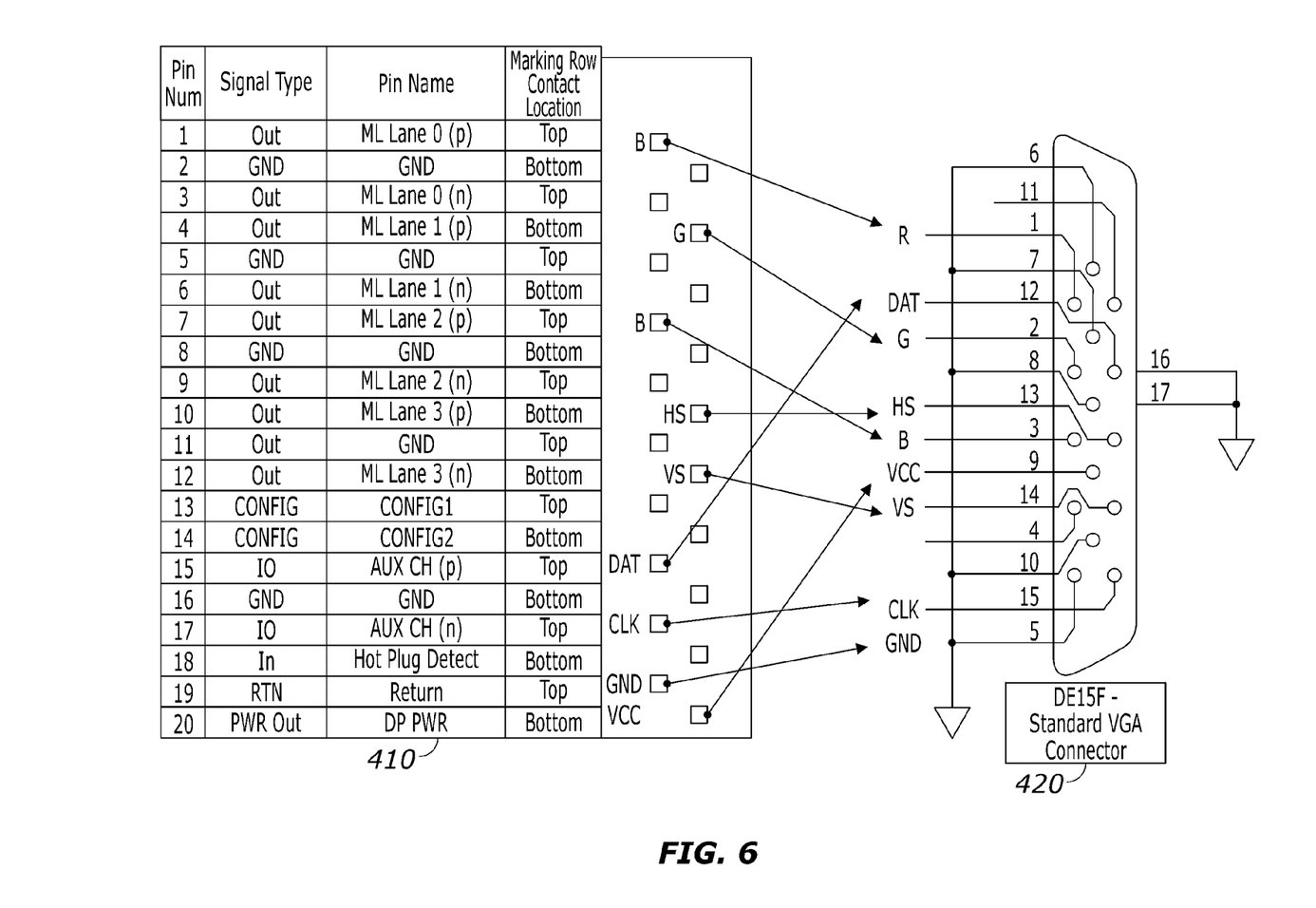
FIG. 6 represents a pin map for a DisplayPort connection to an alternative display protocol in accordance with one aspect of the present disclosure.

Turning now to FIG. 6, a schematic is provided that represents a pin map for a DisplayPort connection to an alternative display protocol in accordance with one aspect of the present disclosure. Generally, a pin map may be a graphic representation depicting the translation of pins from a first display protocol to pins from a second display protocol. For example, if both pin 1 of the first display protocol and pin 7 of the second display protocol carry data for the Blue color signal, a pin map between the two display protocols may indicate that these two pins correspond to each other. Specifically, FIG. 4 illustrates a pin map from a display protocol receptacle 410 output to a standard 15-pin VGA connector 420. However, it should be noted that pin maps from DisplayPort to other display protocols, such as DVI, HDMI, and/or the like are also contemplated within the present disclosure as well as variations to the depicted DisplayPort to VGA pin map. Furthermore, in certain pin maps, some pins may not be used.

As shown in FIG. 6, the Red (R), Green (G), and Blue (B) color signals, which may correspond to DisplayPort pins, 1, 4, and 7 respectively, may each respectively map to pins 1, 2, and 3 on the VGA connector 420. Similarly, horizontal sync (HS) and vertical sync (VS), pins 10 and 12 on the display protocol receptacle 410 respectively, may map to pins 13 and 14 on the VGA connector 420. HS may refer to a frequency signal with which a monitor may try to synchronize a line of display while VS may refer to a frequency signal with which a monitor may try to synchronize an entire frame. DisplayPort pins 15 and 17 may correspond to data (DAT) and clock (CLK) signals and may map to VGA connector pins 12 and 15. DAT and CLK may conform to the Inter-Integrated Circuit (I2C) standard which may in some instances be used to attach low-speed peripheral devices, such as a monitor, to a motherboard. Specifically, the DAT and CLK pins may be used to provide maximum capabilities of monitors such as the maximum operating frequency and resolution. Lastly, ground (GND) and Vcc, which may correspond to pins 19 and 20 on the display protocol receptacle 410, may map to pins 5 and 9 on the VGA connector 420.

It should be noted that DisplayPort and/or VGA may contain more pins that carry other data. However, such data may be specific to their respective display protocols and may have no correspondence with each other. Alternatively, the pins that are not mentioned may contain data irrelevant to a DisplayPort to VGA conversion.

Figure 7:
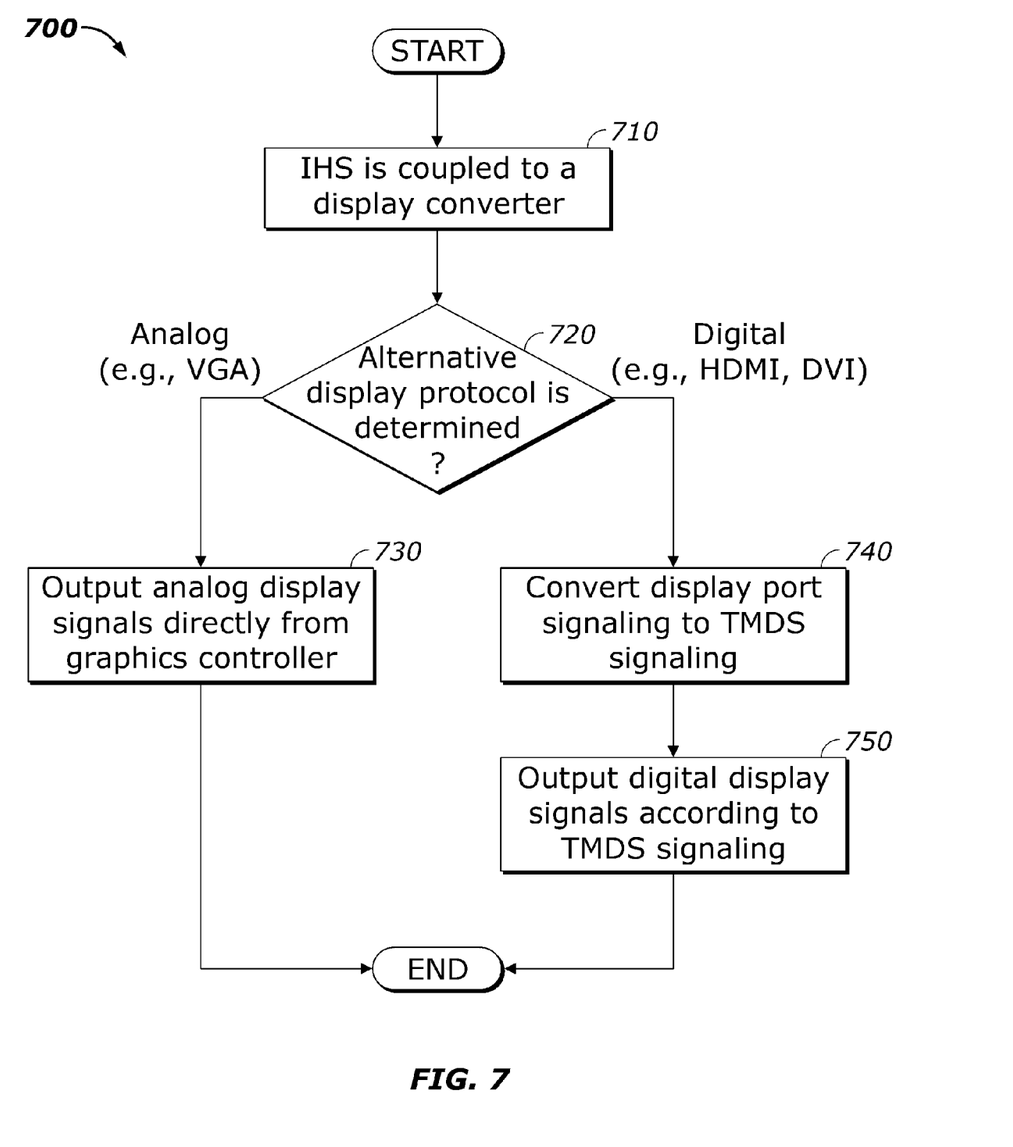
FIG. 7 provides a flow diagram illustrating a method for generating signals associated with an alternative display protocol in accordance with one aspect of the present disclosure.

FIG. 7 provides a method, indicated generally at 700, for generating signals associated with an alternative display protocol in accordance with one aspect of the present disclosure. The method may begin in step 710 where the IHS is coupled to a display converter. As previously mentioned, the display converter may be associated with an alternative display protocol such as any suitable analog display protocol (e.g., VGA) or digital display protocol (e.g., DVI or HDMI). Thus, in step 720, the alternative display protocol may be determined as previously described with reference to FIG. 5. To this end, once the display converter has been received, a display bus switch in the IHS may determine the alternative display protocol.

If the alternative display protocol is VGA, then VGA display signals may be output directly from a graphics controller within the IHS in step 730. Thus, as previously mentioned, digital to analog conversion, which may be present in current display converters and which may degrade VGA output, may be avoided. On the other hand, if the alternative display protocol is DVI or HDMI, the IHS may convert DisplayPort signals to TMDS signals that are used by DVI and HDMI in step 740. After this conversion, in step 750, the IHS may output the DVI or HDMI signals.

The present disclosure provides methods and systems by which the IHS performs any conversions of DisplayPort signals to an alternative display protocol. Thus, the display converter itself, which may coupled to the IHS, may be a pass-through device and may not need any active electronic circuitry to perform such conversion. Consequently, the display converter may be significantly smaller in size relative to current display adapters. Furthermore, the display converter may also be significantly less expensive to produce and therefore less expensive to purchase by a consumer.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system (IHS) comprising:
a display protocol receptacle operable to receive a display protocol plug;
a display bus switch in communication with the display protocol receptacle, wherein the display bus switch is operable to select a single display protocol among multiple display protocols, the display bus switch outputting display signals of the single display protocol selected via the output display; and
a display converter in communication with the IHS, the display converter comprising:
a first end having a display connector associated with an alternative display protocol; and
a second end having a display protocol plug, wherein upon receipt of the display protocol plug by the display protocol receptacle, the display bus switch outputs display signals associated with the alternative display protocol selected by the display bus switch, wherein the display protocol plug comprises an attached end engaged with the display converter and a free end having protruding arms extending horizontally away from the free end, the protruding arms configured to prevent the insertion of the free end into an inappropriate receptacle, wherein the protruding arms are configured to trigger a detector contact in a display protocol receptacle.

2. The system of claim 1, wherein the display protocol receptacle and the display protocol plug are configured for DisplayPort.

3. The system of claim 1, wherein the display converter is a pass-through device.

4. The system of claim 1, wherein the alternative display protocol is selected from a group consisting of Video Graphics Array (VGA), Digital Visual Interface (DVI), and High Definition Multimedia Interface (HDMI).

5. The system of claim 1 further comprising a graphics controller in communication with the display bus switch.

6. The system of claim 5, wherein if the alternative display protocol is Video Graphics Array (VGA), the display bus switch is operable to direct the graphics controller to send display signals via an analog interface.

7. The system of claim 5, wherein if the alternative display protocol is Digital Visual Interface (DVI) or High Definition Multimedia Interface (HDMI), or HDMI, the display bus switch is operable to convert display signals to Transition Minimized Differential Signaling (TMDS) signals.

8. A method for outputting display signals in an information handling system (IHS), the method comprising:
receiving a display converter via a display protocol receptacle in the IHS, wherein the display converter is pass-through device;
selecting a single display protocol among multiple display protocols associated with the display converter; and outputting the appropriate display signals associated with the single display protocol selected via the IHS;
wherein the display converter comprises:
a first end having a display connector associated with an alternative display protocol; and
a second end having a display protocol plug operable to be received by the display protocol receptacle;
wherein the display protocol plug comprises an attached end configured to engage with the display converter and a free end having protruding arms extending horizontally away from the free end, the protruding arms configured to prevent the insertion of the free end into an inappropriate receptacle and to trigger a detector contact in a display protocol receptacle.

9. The method of claim 8, wherein the display protocol receptacle is configured for DisplayPort.

10. The method of claim 8, wherein the display converter is operable to couple a first device associated with DisplayPort to a second device associated with the alternative display protocol.

11. The method of claim 8, wherein the alternative display protocol is selected from a group consisting of Video Graphics Array (VGA), Digital Visual Interface (DVI), and High Definition Multimedia Interface (HDMI).

12. The method of claim 8 further comprising converting DisplayPort signals to Transition Minimized Differential Signaling (TMDS) signals if the alternative display protocol is DVI or HDMI.

13. The method of claim 8 further comprising:
outputting the display signals directly from the display protocol receptacle if the alternative display protocol is VGA, wherein the display protocol receptacle is in communication with the graphics controller within the IHS.

14. An information handling system (IHS) for outputting display signals associated with an output display protocol, or an alternative display protocol, the system comprising:
a display protocol receptacle;
a display converter operable to be received by the display protocol receptacle, wherein upon receipt, the IHS selects a single display protocol among multiple display protocols and outputs display signals of the single display protocol selected associated with the alternative display protocol, and wherein the display converter is a pass-through device;
wherein the display converter comprises:
a first end having a display connector associated with an alternative display protocol; and
a second end having a display protocol plug operable to be received by the display protocol receptacle; and
wherein the display protocol plug comprises an attached end configured to engage with the display converter and a free end having protruding arms extending horizontally away from the free end, the protruding arms configured to prevent the insertion of the free end into an inappropriate receptacle to trigger a detector contact in a display protocol receptacle.

15. The system of claim 14, wherein the display protocol receptacle is configured for DisplayPort.

16. An information handling system (IHS) comprising:
a display protocol receptacle operable to receive a display protocol plug;
a display bus switch in communication with the display protocol receptacle, wherein the display bus switch is operable to select a single display protocol among multiple display protocols, the display bus switch outputting display signals of the single display protocol selected via the output display; and
a display converter in communication with the IHS, the display converter comprising:
a first end having a display connector associated with an alternative display protocol; and
a second end having a display protocol plug, wherein upon receipt of the display protocol plug by the display protocol receptacle, the display bus switch outputs display signals associated with the alternative display protocol selected by the display bus switch;
wherein the display protocol receptacle comprises:
an attached end configured to engage with the display converter and a free end having a protruding arm extending horizontally away from the free end; and
a detector contact to be depressed by the protruding arm upon receipt of the display protocol plug within the display protocol receptacle, wherein upon being depressed, the detector contact closes a switch circuit in communication with the display bus switch thereby indicating receipt of the display converter to the display bus switch.

17. An information handling system (IHS) for outputting display signals associated with an output display protocol, or an alternative display protocol, the system comprising:
a display protocol receptacle; and
a display converter operable to be received by the display protocol receptacle, wherein upon receipt, the IHS selects a single display protocol among multiple display protocols and outputs display signals of the single display protocol selected associated with the alternative display protocol, and wherein the display converter is a pass-through device;
wherein the display converter comprises:
a first end having a display connector associated with an alternative display protocol; and
a second end having a display protocol plug operable to be received by the display protocol receptacle;
wherein the display protocol plug comprises an attached end configured to engage with the display converter and a free end having a protruding arm extending horizontally away from the free end; and
wherein the display protocol receptacle comprises a detector contact to be depressed by the protruding arm upon receipt of the display protocol plug, wherein upon being depressed, the detector contact closes a switch circuit in communication with a display bus switch indicating receipt of the display converter to the display bus switch.

18. An information handling system (IHS) comprising:
a display protocol receptacle operable to receive a display protocol plug;
a display bus switch in communication with the display protocol receptacle; and
a display converter in communication with the IHS, the display converter comprising:
a first end having a display connector associated with an alternative display protocol; and
a second end having a display protocol plug comprising an attached end engaged with the display converter and a free end having a protruding arm extending horizontally away from the free end, wherein upon receipt of the display protocol plug by the display protocol receptacle, the display bus switch outputs display signals associated with the alternative display protocol, wherein the display protocol receptacle comprises a detector contact to be depressed by a protruding arm upon receipt of the display protocol plug within the display protocol receptacle, wherein upon being depressed, the detector contact closes a switch circuit in communication with a display bus switch thereby indicating receipt of a display converter to the display bus switch.

19. An information handling system (IHS) for generating display signals associated with an alternative display protocol, the system comprising:

a display protocol receptacle comprising a detector contact to be depressed by the protruding arm upon receipt of the display protocol plug, wherein upon being depressed, the detector contact closes a switch circuit in communication with a display bus switch indicating receipt of the display converter to the display bus switch; and a display converter operable to be received by the display protocol receptacle, wherein the display protocol plug comprises an attached end configured to engage with the display converter and a free end having a protruding arm extending horizontally away from the free end, wherein upon receipt, the IHS outputs display signals associated with the alternative display protocol, and wherein the display converter is a pass-through device.

* * * * *